US006313203B1

United States Patent
Van Haveren et al.

(10) Patent No.: US 6,313,203 B1
(45) Date of Patent: Nov. 6, 2001

(54) USE OF POLYALCOHOLS AS POLYMER STABILIZERS

(75) Inventors: Jacco Van Haveren, Wageningen; Hendrikus Luitjes, Ede; Gerard Hubert Frans Schmets, Horn; Frans Jeanette Maria Leonardus Peters, Eygelshoven; Erica Gertruda Arnolda Kroon, Swalmen; Johannes Albertus Van Der Waal, Roermond, all of (NL)

(73) Assignee: Akcros Chemicals, Eccles (GB)

( * ) Notice: Subject to any disclaimer, the term of this patent is extended or adjusted under 35 U.S.C. 154(b) by 0 days.

(21) Appl. No.: 09/319,997
(22) PCT Filed: Dec. 18, 1997
(86) PCT No.: PCT/NL97/00709
§ 371 Date: Aug. 4, 1999
§ 102(e) Date: Aug. 4, 1999
(87) PCT Pub. No.: WO98/27148
PCT Pub. Date: Jun. 25, 1998

(30) Foreign Application Priority Data

Dec. 19, 1996 (NL) .................................................. 962036240

(51) Int. Cl.[7] .............................. C08K 5/05; C08F 2/02; C08F 291/08
(52) U.S. Cl. ......................... 524/58; 524/310; 524/732; 525/253; 526/200; 526/202
(58) Field of Search ............................. 524/58, 310, 732; 525/253; 526/200, 202

(56) References Cited

U.S. PATENT DOCUMENTS 3,951,925 * 4/1976 Mishima et al. ..................... 525/266
4,789,715 * 12/1988 Bieringer et al. .................... 525/252
5,502,180 * 3/1996 Kunz et al. ........................... 536/123

FOREIGN PATENT DOCUMENTS

| 27 28 865 | 1/1978 | (DE) . |
| 35 36 936 | 4/1987 | (DE) . |
| 36 43 968 | 6/1988 | (DE) . |
| 0 638 589 | 2/1995 | (EP) . |
| 0 677 549 | 10/1995 | (EP) . |
| 02252701 A * | 10/1900 | (JP) . |
| 09048876 A * | 2/1997 | (JP) . |
| 863602 | 9/1981 | (SU) . |
| 863602 B * | 9/1981 | (SU) . |
| 863 602 | 9/1981 | (SU) . |
| 93 07208 | 4/1993 | (WO) . |

OTHER PUBLICATIONS

Patent abstracts of Japan, App. No. 60–166,852, published Feb. 5, 1987.

Patent abstracts of Japan, App. No. 01–073,842, published Oct. 11, 1990.

Derwent patent abstract, App. No. 82–58899.

Derwent patent abstract, App. No. 97–188406.

* cited by examiner

*Primary Examiner*—James J. Seidleck
*Assistant Examiner*—Olga Asinovsky
(74) *Attorney, Agent, or Firm*—Browdy and Neimark

(57) ABSTRACT

Natural cyclic polyalcohols such as polyfructoses and, dehydration products of sugar alcohols can be used for stabilising thermoplastic polymers, at a ratio of 0.001–5 phr of polyol with respect to the polymer. The cyclic polyol is in particular inulin or sorbitan. The polymer to be stabilised is in particular PVC, PE, PP or a halogenated rubber.

19 Claims, No Drawings

USE OF POLYALCOHOLS AS POLYMER STABILIZERS

CROSS REFERENCE TO RELATED APPLICATION

The present application is the national stage under 35 U.S.C. 371 of PCT/NL97/00709, filed Dec. 18, 1997.

The present invention relates to the use of polyalcohols for stabilising polymers, in particular vinyl chloride polymer and to polymers stabilised with polyalcohols.

The manufacture of plastic articles from organic thermoplastic polymers requires high temperatures (160° C. and higher), which leads to partial degradation of the polymer and hence to lower mechanical performance and discoloring of the product. The problem is especially serious for vinyl halide polymers such as PVC. Stabilisers and co-stabilisers are commonly used for preventing such thermo-oxidative degradation of polymers. Such stabilisers also protect finished polymer-based articles against degradation processes resulting from the action of heat, oxygen and/or (UV) light. Suitable stabilisers should not only prevent degradation of the polymer, but must also be compatible with the various other compounds of the polymer blend, avoiding the release of volatile or other components as a result of dehomogenising, which components may limit the utility of the polymer or may be detrimental to health.

Until now the so-called primary PVC stabilisers have often been based on heavy metal containing compounds, such as cadmium, barium, tin and lead compounds. These primary stabilisers are capable of irreversibly binding hydrogen chloride. More recently inorganic stabilisers based on e.g calcium, zinc, aluminium and magnesium layered structures have been developed. However, their performance is still insufficient to fully replace the heavy metal stabilisers. Further stabilisation is achieved by means of metal-free secondary stabilisers such as epoxy compounds, organic phosphites, antioxidants and light stabilisers. It has been known that hydrogen chloride, but also certain metal chlorides such as zinc chloride, catalyst the degradation of PVC. This unfavourable effect of metal chlorides may be reduced by a reaction with metal compounds such as calcium stearate or e.g. by complexing with polyalcohols and/or organic phosphites or β-diketo compounds. Polyalcohols, such as sorbitol, mannitol, lactitol, (di)pentaerythritol and tris(2-hydroxyethyl) isocyanurate (THEIC) have been proposed as (co)stabilisers for organic polymers.

Various patents describe the use of polyalcohols as stabilises for PVC. Examples of these are DE-A-2728865 which describes the use of mannitol, sorbitol or xylitol, together with calcium and zinc stearates and stearoylbenzoylmethane for stabilising PVC. WO 93/07208 discloses a PVC stabiliser system formed from zinc oxide and pentaerythritol. The use of maltitol and lactitol as stabilisers is described in EP-A-677549. Long-chain fatty acid partial esters of polyols such as polyglucose or sorbitol have been proposed as PVC stabilisers in DE-A-3536936 and DE-A-3643968, respectively. SU patent 863602 teaches the use of xylitan for improving the thermal and mechanical stability of butadiene/styrene latex and similar latices.

Known stabilisers such as sorbitol, mannitol and xylitol show disadvantages in that, although they give a good heat stability, they have a negative effect on the discolouring of the polymer during processing. The more effective ones, such as THEIC, are rather expensive.

It has been found now that thermoplastic polymers, as vinyl chloride polymers, can be effectively stabilised by the addition of certain natural cyclic polyalcohols. These cyclic polyalcohols increase the heat-stability of the polymers and at the same time do not substantially contribute to discolouration. The cyclic polyalcohols are especially non-toxic, food-compatible carbohydrates. Suitable carbohydrates include non-reducing oligo- and poly-saccharides, di- and oligo-saccharides the reducing unit of which has been reduced, acid-catalysed dehydration products of sugar alcohols. Non-reducing polysaccharides preferably have chain lengths of less than 100 monosaccharide units. Examples of cyclic polyalcohols are polyfructoses such as inulin, and levan, and the cyclic mono-dehydration products of sugar alcohols including xylitol, arabinitol, sorbitol (glucitol), galactitol (dulcitol), mannitol, iditol, and higher analogues. The mono-dehydrated products of the hexitols are typically 2-(1,2-dihydroxyethyl)-3,4-dihydroxy-oxolanes or (less commonly) the isomeric 2,5-bis(hydroxymethyl)-3,4-dihydroxy-oxolanes or 2-hydroxymethyl-3,4,5-trihydroxy-oxanes and of the pentitols they are usually 2-hydroxymethyl-3,4-dihydroxy-oxolanes. The anhydro-hexitols are preferred. The mono-dehydration products of xylitol, sorbitol, and galactitol are also known as xylitan, sorbitan and galactitan, respectively. Where reference is made hereafter to anhydro-polyols or sorbitan, these terms also include the anhydro-derivatives of the other sugar alcohols, especially galactitan. Mixtures of anhydropolyols can also be used advantageously, as such components often have complementing stabilising effects.

Preferably at last one of the components is an anhydrohexitol. Examples of useful mixtures are sorbitan/xylitan sorbitan/anhydrolactitol, mannitan/galactitan, sorbitan/inulin, and in particular a mixture of sorbitan and galactitan, e.g. in ratios between 1:3 and 3:1.

The cyclic, non-reducing carbohydrates such as inulin and sorbitan can be used in polymer compounds in a manner known per se. The stabilisers can be mixed with other additives, such as impact modifiers for rigid formulations (for example chlorinated polyethylene or butadiene/styrene/(acrylonitrile) co or ter-polymers), plasticisers for flexible formulations (for example phthalic esters such as dibutyl phthalate or dioctyl phthalate, aliphatic monobasic or dibasic esters such as butyl oleate, epoxidised soybean oil, dioctyl adipate), fillers, pigments, flow modifiers (for example acrylates), lubricants (for example calcium stearate, zinc stearate, fatty esters and amides), flame retardants (for example aluminium hydroxide, antimony trioxide), phosphites (for example triaryl phosphites or aryl-alkyl phosphites), antioxidants (for example hindered phenols), HALS (hindered amine light stabiliser) compounds, UV absorbers (for example benzophenones such as 2-hydroxy-4-methoxybenzophenone, benzotriazoles, salicylates), keto esters and ketones such as N-phenyl-3-acetyl-2,4-pyrrolidine-2,4-dione; other stabilisers such as β-diketones and β-keto esters, β-aminocrotonates including dihydropyridine-3, 5-dicarboxylic esters, uracils, other polyol co-stabilisers such as pentaerythritol, tris-(hydroxyethyl isocyanurate), mannitol and the like may also be used at reduced levels. Examples of suitable formulations are given as compounds A, B and C below. The formulations are then processed into a shaped article by means of calendering, rotational moulding, spread coating, slush moulding, extrusion, injection moulding, blow-moulding or other conventional technique.

Preferentially, the polyol stabilisers are used in combination with a calcium salt such as calcium stearate and/or zinc compounds, such as zinc stearate or zinc oxide. Inulin and the anhydropolyols are preferably used at a level of 0.001–5%, especially 0.01–2%, most preferably 0.05–1% with respect to the thermoplastic polymer. Another class of (co)stabilisers to be used advantageously in combination with the present polyols are the anionic clays, such as alkali metal alumosilicates and other zeolyte-type compounds, and layered multimetal salts commonly referred to as hydrotalcites. The hydrotalcites are considered as an anionic clay with an overall chemical composition of: $M^{2+}_xM^{3+}_y(OH)_{2x+3y-2}CO_3$, in which $M^{2+}$ is a bivalent cation like Mg, Zn, Ni etc. and $M^{3+}$ is a trivalent cation, in particular Al. The carbonate group can be exchanged by other anions or anionic complexes such as hydroxide, nitrate, sulphate, iodide, bromide, chloride, fluoride, oxalate and other (di)carboxylates, oxide, perchlorate and silicate. Typical examples are $Al_2Mg_6(OH)_{16}CO_3.4H_2O$ and $Al_2Mg_4(OH)_{12}CO_3.3H_2O$. The weight ratios between polyol and calcium salt or zinc compound or hydrotalcites or other anionic clay is generally between 10:1 and 1:100, more in particular between 3:1 and 1:10. These stabiliser combinations as such are also part of the invention.

The thermoplastic polymer can be e.g. polyethene, polypropene, polystyrene, halogenated rubber, fluorine-containing polymers, such as poly(vinylidene fluoride), poly(vinylidene-chloride) and, especially, poly(vinyl chloride). PVC, the non-vinyls (polyethene and polypropene) and halogenated rubbers and other halogen-containing polymers such as PVDC, as well as copolymers with other monomers and mixtures with other polymers are preferred according to the invention.

The heat stability of a polymer like PVC can be expressed in the heating time at a selected temperature (e.g. 200° C.) until the polymer degrades as determined by the colour turning brown to black. The test can e.g. be performed in a Matthis oven using a 25 cm polymer strip which is stepwise moved from the oven.

Non-vinyl polymers as PE are investigated in multi-extrusion tests, after the first, third and fifth run, the colour properties and the melt flow index are measured. Polyolefins are very sensitive to UV-light, therefore UV-stabilising tests are carried out.

The colour properties can be expressed as the whiteness according to Berger (Wb (%)) and the Yellowness index (Yi (%)). Both can be determined e.g. using a Minolta Chromameter with a DP 301 data processor. The rating is done according to the CIE L-a-b system (CIE: Commission International d'Eclairage). White/black (L), green/red (a) and yellow/blue (b) values are converted to the Wb and Yi values. For optimum performance, the heat stability and the whiteness should be as high as possible, and the yellowness index should be as low as possible.

The favourable properties of sorbitan are illustrated in tables 1 and 2. Sorbitol and sorbitan were incorporated in polymer compounding mixtures A and B respectively given below (pbr=parts per 100 with respect to polymer). it can be ween from these tables that sorbitol increases heat stability, but at the same time drastically deteriorates the colour properties when compared with the blanc. Depending on the particular compound, sorbitan has a somewhat lower (A) or somewhat higher (B) stabilizing effect but the colour properties remain unaffected. Whereas the lower stabilising effect of sorbitan, if at all present, can be compensated by using other additives, the poor colour properties of sorbitol cannot be compensated easily by using other components.

The favorable properties of inulin art illustrated in tables 3 and 4. Inulin (fractionated chicory inulin, average DP 21.4) was incorporated at different levels in polymer compounding mixture A and B respectively. While the heat stability is increased substantially, both the whiteness and the yellowness index remain virtually unchanged. Table 5 shows the effect of average degree of polymerisation (DP) of the inulin on the stabilising properties. The preferred average DP is between 5 and 40, in particular between 10 and 25. Preferably, the inulin is substantially free from mono- and di-saccharides. The favourable effect of anhydrohexitols and hydrotalcite on the heat stability is shown by table 6.

| Compound A (Rigid PVC): | | |
|---|---|---|
| Polyvinylchloride | S-PVC (K-68) | 100 parts |
| Impact modifier | acrylate compounds | 2–15 phr |
| Filler | chalk | 2–12 phr |
| Pigment | titanium dioxide | 1–10 phr |
| Flow modifier | acrylate ester homopolymer | 0.1–3 phr |
| Metal stabiliser | calcium/zinc stabiliser | 0.1–5 phr |
| Lubricant | PE wax | 0.01–2 phr |
| Compound B (Rigid PVC): | | |
| Compound A + | | |
| Polyol | THEIC | 0–1 phr |
| Polyol | lactone | 0.01–2 phr |
| Polyol | partial ester | 0.01–1 phr |
| Layered clay | anionic clay | 0.01–2 phr |
| Costabiliser | β-diketone | 0.01–2 phr |
| Organic phosphite | organic diphosphite | 0.01–2 phr |
| Compound C (Flexible PVC): | | |
| Polyvinylchloride | S-PVC (K-71) | 100 parts |
| Plasticiser | dioctyl phthalate | 10–50 phr |
| Epoxy plasticiser | epoxidised soybean oil | 0.3–10 phr |
| Lubricant | PE wax | 0.01–2 phr |
| Organic zinc salt | liquid zinc stabiliser | 0.01–2 phr |
| Inorganic stabiliser | anionic clay | 0.01–5 phr |

TABLE 1

Heat stability of rigid PVC (compound A) stabilised by sorbitol or sorbitan

| | heat-stability (minutes) | Wb (%) | Yi (%) |
|---|---|---|---|
| blanc | 21.4 | 46.5 | 15.1 |
| sorbitol 0.5 phr | 34.9 | 16.5 | 26.3 |
| sorbitan 0.5 phr | 27.0 | 42.0 | 16.8 |

TABLE 2

Heat stability of rigid PVC (compound B) stabilised by sorbitol or sorbitan

| | heat-stability (minutes) | Wb (%) | Yi (%) |
|---|---|---|---|
| blanc | 58.5 | 62.2 | 9.6 |
| sorbitol 0.5 phr | 70.2 | 37.6 | 18.8 |
| sorbitan 0.5 phr | 75.0 | 62.9 | 9.5 |

TABLE 3

Heat stability of PVC stabilised with inulin (compound A)

| | heat-stability (minutes) | Wb (%) | Yi (%) |
|---|---|---|---|
| blanc | 21.4 | 46.5 | 15.1 |
| inulin 0.1 phr | 23.4 | 43.7 | 15.9 |

TABLE 3-continued

Heat stability of PVC stabilised with inulin (compound A)

|  | heat-stability (minutes) | Wb (%) | Yi (%) |
|---|---|---|---|
| inulin 0.5 phr | 27.0 | 37.1 | 17.7 |
| inulin 1.0 phr | 29.7 | 27.7 | 20.7 |

TABLE 4

Heat stability of PVC stabilised with inulin (compound B)

|  | heat-stability (minutes) | Wb (%) | Yi (%) |
|---|---|---|---|
| blanc | 58.5 | 62.2 | 9.6 |
| inulin 0.1 phr | 67.5 | 61.1 | 9.9 |
| inulin 0.5 phr | 69.8 | 56.7 | 11.0 |
| inulin 1.0 phr | 72.0 | 52.5 | 12.1 |

TABLE 5

Influence of inulin chain length on stability and colour properties

| DP Inulin (0.5 phr) | heat stability (minutes) | Wb (%) | Yi (%) |
|---|---|---|---|
| - (blanc) | 57.6 | 62.3 | 9.5 |
| 3.4 | 65.3 | 44.7 | 14.3 |
| 6.6 | 68.9 | 45.2 | 13.8 |
| 10.3 | 71.6 | 52.0 | 12.4 |
| 13.3 | 72.0 | 54.5 | 11.6 |
| 21.4 | 72.0 | 54.1 | 11.8 |
| 25.0 | 70.7 | 53.3 | 11.9 |

TABLE 6

Heat stability of flexible PVC (compound C) stabilised with hydrotalcite (Alc 4) and sorbitan/galactitan

| stabiliser (phr) | | | heat-stability | | |
|---|---|---|---|---|---|
| Alc 4 | sorbitan | galactitan | (minutes) | Wb (%) | Yi (%) |
| none (blanc) | | | 24.8 | 42.0 | 13.4 |
| 0.15 | — | — | 29.0 | 31.7 | 17.8 |
| — | 0.3 | — | 27.0 | 40.8 | 14.0 |
| 0.15 | 0.15 | — | 32.4 | 28.4 | 19.8 |
| — | 0.15 | 0.15 | 27.9 | 33.2 | 15.9 |
| 0.15 | 0.075 | 0.075 | 42.3 | 20.9 | 22.2 |

What is claimed is:

1. A process of stabilizing a thermoplastic polymer comprising incorporating in said thermoplastic polymer an effective amount for stabilization of at least one cyclic polyol selected from the group consisting of polyfructoses having an average chain length of 3–60 anhydrofructose units and dehydration products of hexitols.

2. The process according to claim 1, wherein 0.001–5 phr of polyol is incorporated with respect to the polymer.

3. The process according to claim 2, wherein 0.01–5 phr of polyol is incorporated with respect to the polymer.

4. A process for stabilizing a thermoplastic polymer comprising incorporating in said thermoplastic polymer an effective amount for stabilization of inulin having an average chain length of 3–60 anhydrofructose units.

5. The process according to claim 4, wherein the inulin contains less than 1% of glucose and fructose.

6. A process of stabilizing a thermoplastic polymer comprising incorporating in said thermoplastic polymer an effective amount for stabilization of at least one of sorbitan and galactitan.

7. The process according to claim 1, wherein the thermoplastic polymer is selected from the group consisting of halogen-containing polymers, polyethylene and polypropylene.

8. A process of stabilizing a thermoplastic polymer comprising incorporating in said thermoplastic polymer an effective amount for stabilization of at least one cyclic polyol selected from the group consisting of polyfructoses and dehydration products of hexitols, wherein the cyclic polyol is combined with an additive which is an organic calcium salt, a zinc compound, an anionic clay, or a mixture of two or more of said additives.

9. A stabilizing composition comprising one or more cyclic polyols selected from the group consisting of polyfructoses and dehydration products of sugar alcohols, combined with one or more inorganic anionic clay stabilizers.

10. The stabilizing composition according to claim 9, comprising at least one anhydro-hexitol and a hydrotalcite.

11. The stabilizing composition according to claim 9, wherein the weight ratio of cyclic polyol to inorganic stabilizer is between 10:1 and 1:100.

12. In a compounded mixture of a thermoplastic polymer and a stabilizer, the improvement wherein said stabilizer comprises 0.01–2 phr, with respect to the polymer, of a cyclic polyol selected from the group consisting of inulin having an average chain length of 3–60 anhydrofructose units, sorbitan, galactitan and a mixture of at least two of said cyclic polyols.

13. The compounded mixture according to claim 12, further containing 0.01–2 phr of at least one of an organic calcium salt, a zinc compound and an anionic clay.

14. A shaped article comprising thermoplastic polymer stabilized by incorporation therein of 0.01–2 phr, with respect to the polymer, of at least one cyclic polyol selected from the group consisting of polyfructoses having an average chain length of 3–60 anhydrofructose units and dehydration products of hexitols.

15. The process according to claim 4, wherein the inulin has an average chain length of 5–40 anhydrofructose units.

16. The process according to claim 15, wherein the inulin has an average chain length of 10–25 anhydrofructose units.

17. The process according to claim 4, wherein the inulin contains less than 1% of glucose, fructose and sucrose.

18. The process according to claim 1, wherein the thermoplastic polymer is selected from the group consisting of vinyl chloride polymers and copolymers.

19. The stabilizing composition according to claim 9, wherein the weight ratio of cyclic polyol to inorganic stabilizer is between 3:1 and 1:10.

* * * * *